June 28, 1955  O. RASMUSSEN  2,711,638
PYROPHORIC IGNITER
Filed Nov. 27, 1953

INVENTOR
OLAF RASMUSSEN
BY Walter W. Liedke
HIS ATTORNEY

United States Patent Office 2,711,638
Patented June 28, 1955

2,711,638

PYROPHORIC IGNITER

Olaf Rasmussen, Port Clinton, Ohio

Application November 27, 1953, Serial No. 394,673

7 Claims. (Cl. 67—6.1)

This invention relates to an improved igniter particularly adapted to ignite welding torches.

It is among the objects of the present invention to provide an igniter for welding torches, said igniter being sturdy and of simple construction, attachable to a bench or the like and capable of producing sparks whenever it is struck by the torch.

A further object of the present invention is to provide an igniter having spark producing means movable only by being struck and producing sparks in response to movement of said means in either direction.

Further objects and advantages of the present invention will be apparent from the following description, reference being had to the accompanying drawings wherein a preferred embodiment of the present invention is shown.

Igniters for welding torches have long been used, especially flint lighters of the scissors type, grasped in one hand of the operator and actuated thereby to produce sparks while the other hand of the operator holds the welding torch in proximity to the sparking element of the igniter. This requires the use of both hands of the operator and if adjustments of the torch are necessary to facilitate combustion, the igniter must be laid aside to free the one hand for making such adjustments on the torch. This type of igniter has been proven dangerous inasmuch as operators have been seriously burned as a result of improper positioning of the torch relatively to the hand held igniter which must be held close to the nozzle of the torch for rendering the produced sparks effective to ignite the gases emanating from said nozzle.

Other igniters are known to have movable, spark producing elements which, when struck by the torch and moved out of normal position, produce sparks, said spark producing element being returned to normal position by a spring. Thus these igniters have an active stroke and also an idle, return to normal stroke.

The igniter of the present invention is superior to either one of the aforementioned igniters inasmuch as it entirely eliminates the hazards of the one, and an extra movement and part viz, the return to normal and the spring for effecting said movement, of the other. The igniter of the present invention provides a spark producing member effective in either direction of movement to produce sparks. It has no idle, return to normal movement, but on the contrary produces effective igniting sparks whenever it is moved.

Figure 1:
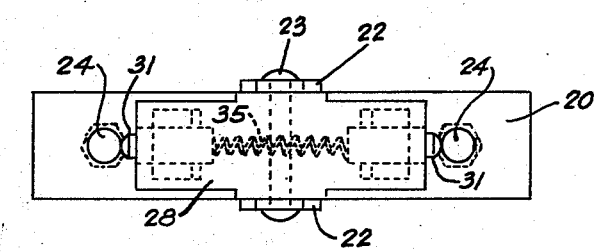
Fig. 1 is a plan view of the device.
Figure 2:
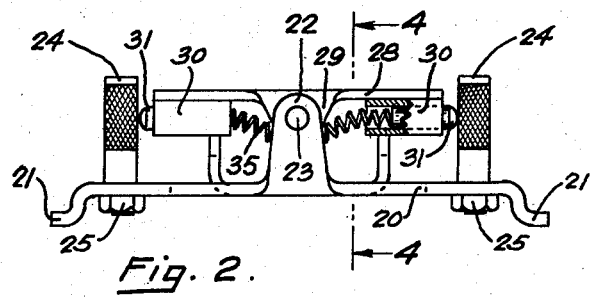
Fig. 2 is a front view of the device.
Figure 3:
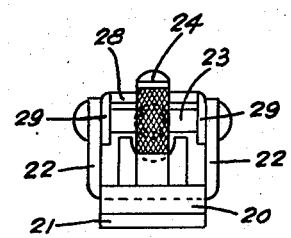
Fig. 3 is an end view of the device.
Figure 7:
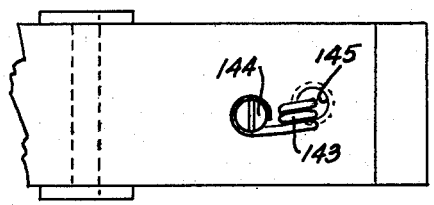
Fig. 7 is a fragmentary view of the bottom of the base shown in Fig. 5.

Referring to the drawings, the device illustrated in Figs. 1, 2 and 3 consists of a rigid, stationary base 20, the opposite ends of which are formed to provide feet 21. At each side of base 20 and midway between its ends, upturned ears 22 form spaced standards which support the pivot pin 23 transversely of the base. Adjacent each end of base 20 a knurled post or member 24 is attached to the base by a nut 25, which when loosened, permits the post or member to be rotatively moved in order that a new, unworn area of the member may be presented for engagement by the flint block of the device.

A striker plate 28 has oppositely disposed ears 29, midway between its ends, said ears pivotally fitting about the pin 23 supported by the base. Thus plate 28 may see-saw about the pivot pin 23 in response to being struck by the welding torch, the respective ends of said plate being adjacent a respective knurled post or member 24. A tubular receptacle 30 is attached to the inside surface of plate 28 at each end thereof, each recepacle slidably supporting a flint block 31 so that the outer end of each flint block may engage a respective knurled member 24. To maintain these flint blocks in frictional engagement with their respective knurled members 24, a spring 35 is interposed between said flint blocks as shown in Fig. 2. Inasmuch as the axial center of pivot pin 23 is in the same horizontal plane as the axial center of the flint blocks 31, spring 35 is flexed to pass beneath the pivot pin 23 as shown in Fig. 2.

Figure 4:
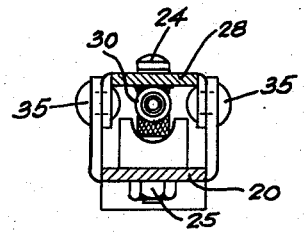
Fig. 4 is a sectional view taken along the line 4—4 of Fig. 2, showing a modified form of construction.

The Fig. 4 shows a modified construction of the device. Here the pivot pin 23 is eliminated and instead, the adjacent ears 22 and 29 of the base and striker plate respectively are pivotally secured together by individual rivets 35, whereby the necessity of flexing the spring 35 as shown in Fig. 2, is avoided, the spring 35 in this construction being straight and substantially concentric with both flint blocks.

Figure 5:
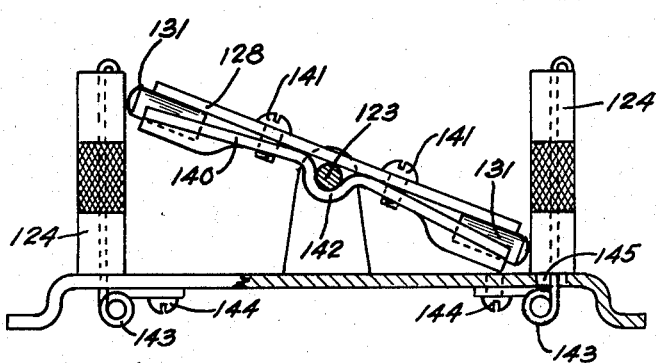
Fig. 5 is a front view of a modified form of the device.
Figure 6:
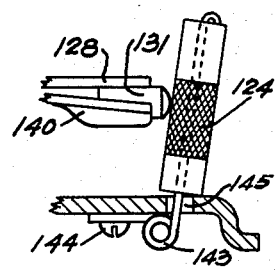
Fig. 6 is a fragmentary view showing an element of the device of Fig. 5, in a shifted position.

Fig. 5 illustrates another modified form of construction. Here the flint blocks are tightly clamped upon the striker plate 128 by the clamp plate 140 which is held against the inner side of the striker plate by screws 141. A hump 142, midway between the ends of the clamp plate 140 forms a recess in which the pivot pin 123 seats, the clamping of plate 140 upon plate 128 by screws 141 holding the assembly on said pin and also clamping the respective flint blocks 131 at the ends of plate 128 upon said plate so that the flint blocks extend beyond the respective ends of said plate 128. A coil spring 143 adjacent each end of the base 120 has one end attached to said base by a screw 144, the opposite end of the spring having a straight portion extending through an opening 145 in the base and lengthwise, centrally through the knurled post or member 124 to which the end of the spring is attached in any suitable manner. It will be noted that in this construction the posts or members 124 are movably resting upon the base 120, being constantly urged into frictional engagement with the respective flint blocks by the springs 143 which resist movement of said members 124 out of the normal vertical position as shown in Fig. 5 into the tilted position as shown in Fig. 6, resulting from the actuation of the striker plate 128. Thus like in the device shown in Fig. 2, the igniter shown in Fig. 5 will have the flint blocks 131 and the respective posts or members 124 maintained in frictional engagement by spring means, 35 in Fig. 2 and 143 in Fig. 5.

Figure 8:
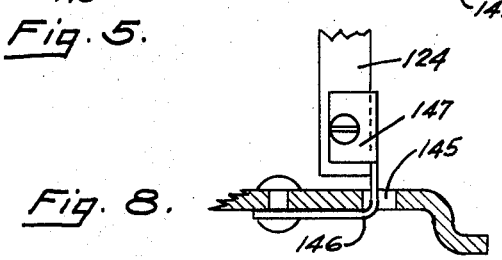
Fig. 8 illustrates another modified construction.

Fig. 8 shows still another form of modified igniter differing from that shown in Fig. 5 in that a flat blade spring 146 is provided instead of the coil spring 143. Blade spring 146 has a housing portion 147 forming a receptacle for the member 124

Striking the raised end of the striker plate with the nozzle end of a welding torch causes the striker plate to be actuated causing the flint block at the struck end of the striker plate to pass over the engaged knurled member and produce sparks which will ignite the gas emanating from the torch nozzle. For the succeeding use the other end of the striker plate is in the up position ready for striking.

What is claimed is as follows:

1. An igniter consisting of a stationary base upon which two knurled members are mounted in spaced relation; a tiltable striker plate pivotally carried by the base midway between said knurled members and movable in a see-saw manner relatively thereto; two flint blocks slidably carried by the striker plate, one at each end of said plate, each flint block being engageable with a knurled member; and spring means urging said flint blocks into frictional engagement with the respective knurled members.

2. An igniter consisting of a stationary base; two knurled posts attached to the base in spaced relation; a clamping element securing each post to the base, each clamping element being operative to release the post for permitting rotative adjustment of the post relatively to the base; a tiltable striker plate pivotally supported by the base midway between the said posts and operative in a see-saw manner relatively thereto; and a spring loaded flint block slidably carried by the striker plate at each end thereof, each flint block frictionally engaging a respective knurled post.

3. An igniter consisting of a stationary base; a striker plate pivotally carried by said base between the ends of the base and said plate and operative in a see-saw manner relatively to said base; a flint block supported at each end of the striker plate; a knurled member supported by the base at each end thereof, each knurled member being frictionally engageable by a flint block; and resilient means operative to maintain frictional engagement between the respective flint blocks and knurled members.

4. An igniter consisting of a rigid base having two knurled members supported thereby each adjacent an end of said base; a striker plate pivotally attached to the base intermediate the ends of the plate and midway between said knurled members and operative in a see-saw manner relatively to said base, said striker plate supporting a flint block at each end thereof, each flint block frictionally engaging a respective knurled member; and spring means operative to maintain frictional engagement between the respective flint blocks and knurled members.

5. An igniter consisting of a stationary base; a striker plate pivotally supported intermediate its ends by the base said plate being operative in a see-saw manner relatively to the base, said striker plate having a flint block adjustably secured at each end thereof; two knurled members movably attached to the base, each member being engageable by a respective flint block; and resilient means securing each knurled member to the base whereby said members are tiltable relatively to the base in response to tilting of the striker plate.

6. An igniter consisting of a stationary base upon which two knurled members are secured in spaced relation; releasable means securing each of said members to the base; a striker plate pivotally secured to the base midway between said knurled members and operative in a see-saw manner relatively thereto; a flint block adjustably attached to the striker plate at each end thereof; and spring means engaging both flint blocks, said spring means urging the flint blocks into frictional engagement with the respective knurled members.

7. An igniter consisting of a stationary base having a knurled upright standard provided at each end thereof; transverse fulcrum means provided on the base intermediate the knurled standards thereon; a lever pivotally supported upon said fulcrum means intermediate the ends of the lever, and capable of see-saw movement relatively to the base; a flint block at each end of the lever, each flint block frictionally engaging a knurled standard; and resilient means operative to maintain frictional engagement between the respective flint blocks and the knurled standards.

References Cited in the file of this patent

UNITED STATES PATENTS

| | | |
|---|---|---|
| 1,558,450 | Aronson | Oct. 27, 1925 |
| 2,418,631 | Geiger | Apr. 8, 1947 |
| 2,502,073 | Black | Mar. 28, 1950 |